(12) United States Patent
Ohguma

(10) Patent No.: US 12,403,959 B2
(45) Date of Patent: Sep. 2, 2025

(54) VEHICLE COWL STRUCTURE

(71) Applicant: SUBARU CORPORATION, Tokyo (JP)

(72) Inventor: Tomoya Ohguma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 384 days.

(21) Appl. No.: 18/116,101

(22) Filed: Mar. 1, 2023

(65) Prior Publication Data

US 2023/0294773 A1  Sep. 21, 2023

(30) Foreign Application Priority Data

Mar. 21, 2022  (JP) .................................. 2022-044776

(51) Int. Cl.
 *B62D 25/08* (2006.01)
 *B60R 13/07* (2006.01)

(52) U.S. Cl.
 CPC ............ *B62D 25/081* (2013.01); *B60R 13/07* (2013.01)

(58) Field of Classification Search
 CPC .............................. B62D 25/081; B60R 13/07
 USPC ........................................................ 296/192
 See application file for complete search history.

(56) References Cited

U.S. PATENT DOCUMENTS

| | | | | |
|---|---|---|---|---|
| 4,466,654 A | * | 8/1984 | Abe ......................... | B60H 1/28 15/250.16 |
| 5,145,457 A | * | 9/1992 | Tanigaito ............. | B62D 25/081 296/192 |
| 5,368,620 A | * | 11/1994 | Chiba .................. | B62D 25/081 96/60 |
| 2003/0107243 A1 | * | 6/2003 | Hayashi ............... | B62D 25/081 296/192 |
| 2005/0179285 A1 | * | 8/2005 | Nakajima ............ | B62D 25/081 296/192 |
| 2008/0246311 A1 | * | 10/2008 | Hagino .................. | B62D 25/24 296/192 |
| 2009/0058139 A1 | * | 3/2009 | Izawa .................. | B62D 25/081 296/192 |

(Continued)

FOREIGN PATENT DOCUMENTS

| | | | | | |
|---|---|---|---|---|---|
| DE | 3043476 A | * | 4/1981 | ............... | B60H 1/28 |
| EP | 1568578 A1 | * | 8/2005 | ............. | B60R 21/34 |
| EP | 2067691 A2 | * | 6/2009 | ............... | B60H 1/28 |

(Continued)

*Primary Examiner* — Hilary L Gutman
(74) *Attorney, Agent, or Firm* — MCGINN I.P. LAW GROUP, PLLC

(57) ABSTRACT

A vehicle cowl structure includes a cowl body, a cowl panel, an air outlet, and a chamber. The cowl body has a recessed shape with an upper opening facing a vehicle upper side when viewed in a longitudinal direction thereof. The cowl panel closes the upper opening of the cowl body and has an outside air inlet. The outside air inlet allows outside air to be introduced into the cowl body. The air outlet is disposed in the cowl body and allows air inside the cowl body to be discharged toward a vehicle interior. The chamber has a hollow interior, is provided in a bottom part of the cowl body, and is disposed between the outside air inlet and the air outlet in a vehicle width direction. The chamber includes a blocking wall, a chamber-side drainage outlet, and a communication port. The blocking wall has a water inlet.

7 Claims, 5 Drawing Sheets

(56) References Cited

U.S. PATENT DOCUMENTS

2016/0280042 A1* 9/2016 Powers ................... B60H 1/28
2017/0144709 A1* 5/2017 Nakashima .............. B60J 10/70

FOREIGN PATENT DOCUMENTS

| GB | 2490998 A | * | 11/2012 | ........... B62D 25/081 |
|---|---|---|---|---|
| JP | 62157871 A | * | 7/1987 | |
| JP | S6376510 U | * | 5/1988 | |
| JP | 03208781 A | * | 9/1991 | |
| JP | 03213475 A | * | 9/1991 | |
| JP | 04085183 A | * | 3/1992 | |
| JP | 2007-125995 A | | 5/2007 | |
| JP | 4540468 B2 | * | 9/2010 | ............... B60H 1/28 |
| JP | 2016215714 A | * | 12/2016 | |
| JP | 6357443 B2 | * | 7/2018 | |
| JP | 6979260 B2 | * | 12/2021 | |

* cited by examiner

VEHICLE COWL STRUCTURE

CROSS-REFERENCE TO RELATED APPLICATIONS

The present application claims priority from Japanese Patent Application No. 2022-044776 filed on Mar. 21, 2022, the entire contents of which are hereby incorporated by reference.

BACKGROUND

The disclosure relates to a vehicle cowl structure.

A vehicle cowl structure is configured to, when outside air is introduced into a cowl, allow air and liquid such as rainwater contained in the outside air to be separated from each other, and to send the separated air to an air conditioner side. For example, Japanese Unexamined Patent Application Publication (JP-A) No. 2007-125995 discloses a cowl structure in which a cowl duct is provided in a cowl and partitions the inside of the cowl. The cowl duct has a hole through which air is sent to the air conditioner side and a rib around the hole. Thus, when outside air is introduced into the cowl, the rib of the cowl duct allows air and liquid such as rainwater contained in the outside air to be separated from each other.

SUMMARY

An aspect of the disclosure provides a vehicle cowl structure. The vehicle cowl structure includes a cowl body, a cowl panel, an air outlet, and a chamber. The cowl body extends in a vehicle width direction on a vehicle front side of a lower end of a windshield glass of the vehicle and has a recessed shape with an upper opening facing a vehicle upper side when viewed in a longitudinal direction of the cowl body. The cowl panel extends in the vehicle width direction on the vehicle upper side of the cowl body, closes the upper opening of the cowl body, and has an outside air inlet. The outside air inlet allows outside air to be introduced into the cowl body. The air outlet is disposed in the cowl body and allows air inside the cowl body to be discharged toward a vehicle interior of the vehicle. The chamber has a hollow interior serving as a chamber interior, is provided in a bottom part of the cowl body, and is disposed between the outside air inlet and the air outlet in the vehicle width direction. The chamber includes a blocking wall, a chamber-side drainage outlet, and a communication port. The blocking wall constitutes a wall of the chamber on a side of the outside air inlet, extends upward from a bottom wall of the cowl body, and has, at a lower end of the blocking wall, a water inlet. The water inlet allows liquid inside the cowl body to be drawn into the chamber interior. The chamber-side drainage outlet allows the liquid drawn into the chamber interior to be drained out. The communication port is disposed on a side of the air outlet side with respect to the blocking wall and allows the chamber interior to communicate with an inside of the cowl body.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
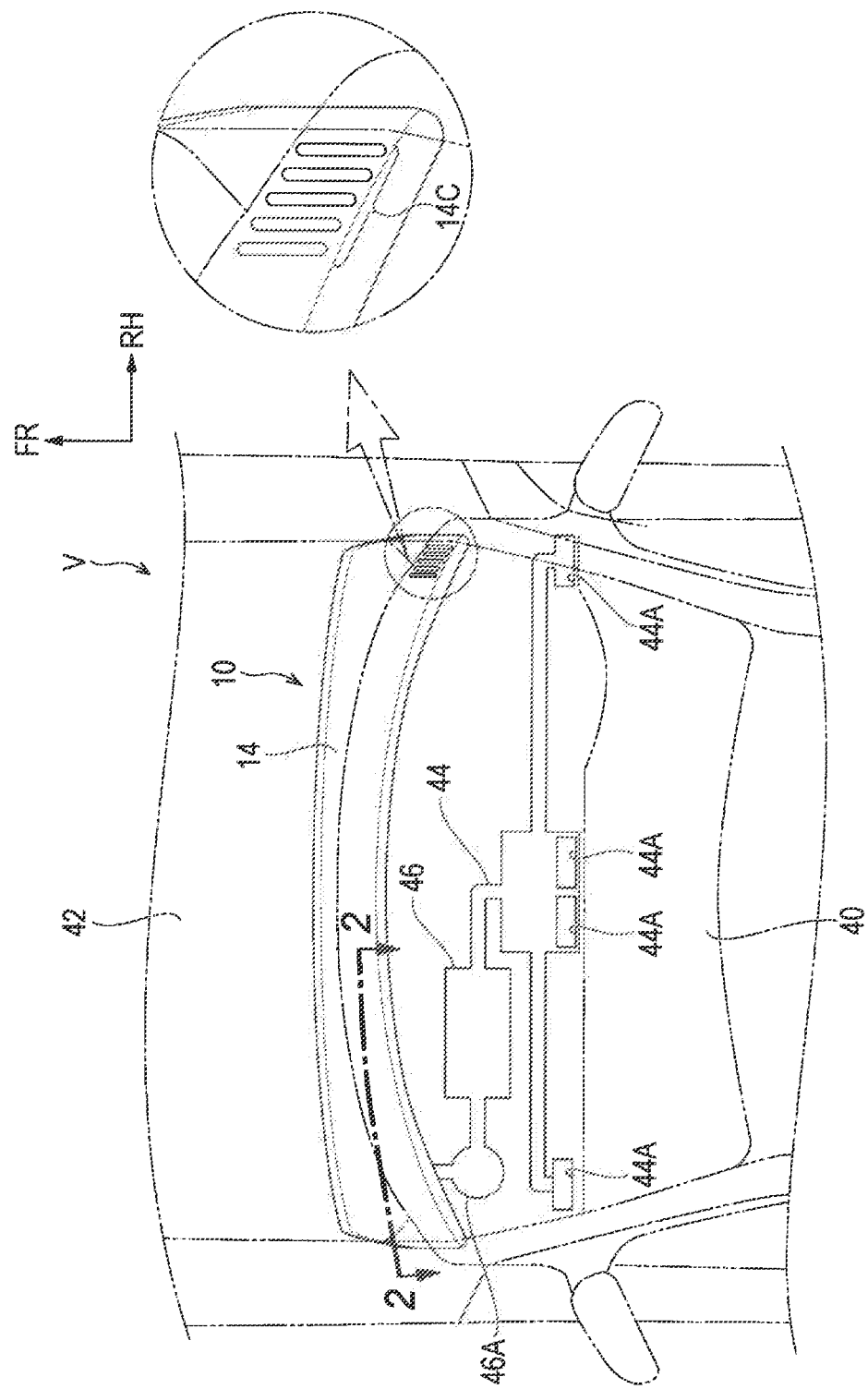
FIG. 1 is a partially schematic, top plan view of a front part of a vehicle to which a vehicle cowl structure according to the present embodiment is applied.

Recent trend is that a passageway for air in a cowl is relatively narrow when a wiper unit, an airbag, and the like are mounted in the cowl. This results in a relatively high flow velocity of outside air flowing through the cowl, and difficulty in achievement of satisfactory separation between air and liquid contained in the outside air. Thus, the cowl structure is desired to achieve satisfactory separation between the liquid and the air.

It is desirable to provide a vehicle cowl structure that makes it possible to achieve satisfactory separation between liquid and air.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle cowl structure 10 (hereinafter, simply referred to as the cowl structure 10) according to the present embodiment will be described with reference to the drawings. Note that, arrow UP, arrow FR, and arrow RH, which are illustrated as appropriate in the drawings, indicate a vehicle upper side, a vehicle front side, and a vehicle right side (a first side in a vehicle width direction), respectively, of a vehicle (automobile) V to which the cowl structure 10 is applied. In the following description, unless otherwise specified, an up-down direction, a front-rear direction, and a left-right direction refer to a vehicle up-down direction, a vehicle front-rear direction, and a vehicle left-right direction, respectively.

Overall Configuration

As illustrated in FIG. 1, the cowl structure 10 is disposed on a front side of a lower end (front end) of a windshield glass 40 of the vehicle V, and on a lower side of a rear end of a hood 42 of the vehicle V. The cowl structure 10 has a substantially cylindrical shape extending in the vehicle width direction as a whole. An inside of the cowl structure 10 serves as a cowl duct part 16 (see FIG. 3). The cowl structure 10 has outside air inlets 14C and an air outlet 12H (see FIG. 2). Each of the outside air inlets 14C is configured to allow outside air (air) to be introduced into the cowl duct part 16. The air outlet 12H is configured to allow the air introduced into the cowl duct part 16 to be discharged toward a vehicle interior. One end of an air-conditioning duct 44 of the vehicle V is coupled to the air outlet 12H. The air discharged from the air outlet 12H into the air-conditioning duct 44 is supplied into the vehicle interior through air vents 44A. The air vents 44A constitute the other ends of the air-conditioning duct 44. An air conditioner 46 is provided to an intermediate part of the air-conditioning duct 44 and includes a blower fan 46A. The blower fan 46A is operated to generate, in the cowl duct part 16, airflow directed from the outside air inlets 14C to the air outlet 12H.

Cowl Structure 10

As illustrated in FIGS. 1 to 4, the cowl structure 10 includes a cowl body 12, a cowl top panel 14, and a gas-liquid separation mechanism 20. In one embodiment, the cowl top panel 14 may serve as a "cowl panel".

Cowl Body 12

The cowl body 12 is made of a metal plate. The cowl body 12 extends in the vehicle width direction and has longitudinal ends joined to an apron member (not illustrated). The apron member constitutes a frame member of the vehicle V. The cowl body 12 has a recessed shape with an upper opening when viewed in the longitudinal direction thereof. In one example, the cowl body 12 includes a bottom wall 12A, a front wall 12B, and a rear wall 12C. The front wall 12B extends upward from a front end of the bottom wall 12A. The rear wall 12C extends upward from a rear end of the bottom wall 12A.

A flange 12D bent forward is formed at an upper end of the front wall 12B of the cowl body 12. A flange 12E is formed at an upper end of the rear wall 12C of the cowl body 12. The flange 12E is bent rearward and obliquely upward and disposed below the lower end (front end) of the windshield glass 40. The rear wall 12C of the cowl body 12 is coupled to a dash panel (not illustrated) that partitions an engine room and the vehicle interior of the vehicle V. The rear wall 12C of the cowl body 12 has, at its left end, the air outlet 12H (see FIG. 2) penetrating therethrough. The air outlet 12H has a substantially rectangular shape whose longitudinal direction corresponds to the left-right direction.

Cowl Top Panel 14

The cowl top panel 14 is made of a resin material. The cowl top panel 14 has a substantially long plate shape extending in the vehicle width direction. A flange 14A is formed at a front end of the cowl top panel 14. The flange 14A protrudes forward, is disposed on the flange 12D of the cowl body 12, and is fixed to the flange 12D by a fastening member such as a clip. A panel coupler 14B (see FIG. 3) is formed at a rear end of the cowl top panel 14. The panel coupler 14B has a substantially U shape that is open rearward and obliquely upward when viewed in the longitudinal direction of the cowl top panel 14. The lower end of the windshield glass 40 is inserted into the panel coupler 14B. The panel coupler 14B is fixed to the flange 12E of the cowl body 12 by a fastening member such as a clip. Thus, the upper opening of the cowl body 12 is closed by the cowl top panel 14. The inside of the cowl structure 10 defined by the cowl body 12 and the cowl top panel 14 serves as the cowl duct part 16.

The cowl top panel 14 has, at its right end, outside air inlets 14C penetrating therethrough. The outside air inlets 14C each have a substantially long hole shape whose longitudinal direction corresponds to a substantially front-rear direction, and are disposed side by side at predetermined intervals in the left-right direction. This allows communication, through the outside air inlets 14C, between the inside and the outside of the cowl duct part 16.

Gas-Liquid Separation Mechanism 20

Figure 2:
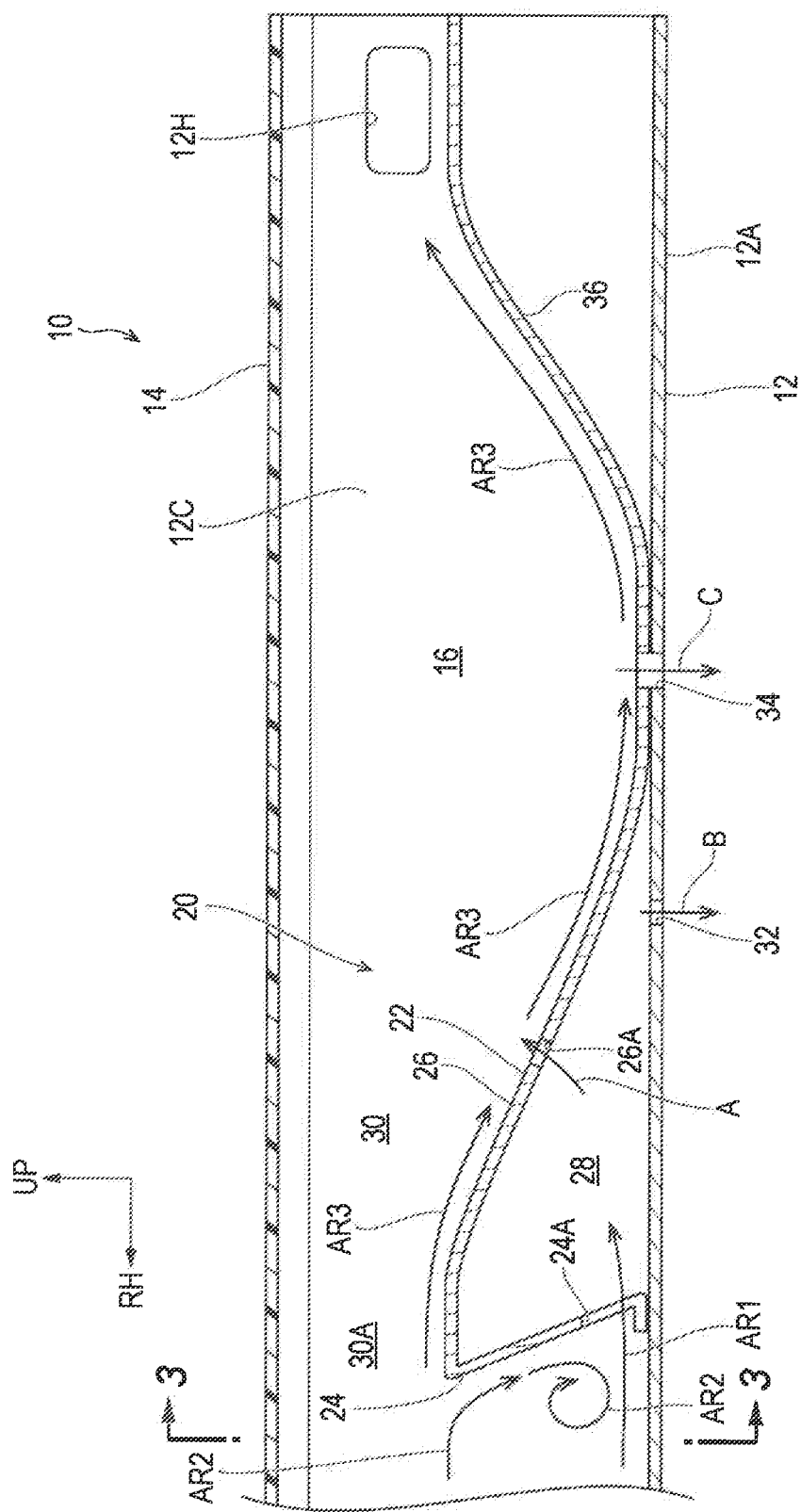
FIG. 2 is a schematic, front sectional view (enlarged sectional view taken along line 2-2 in FIG. 1) of an inside of a left part of the vehicle cowl structure illustrated in FIG. 1.
Figure 3:
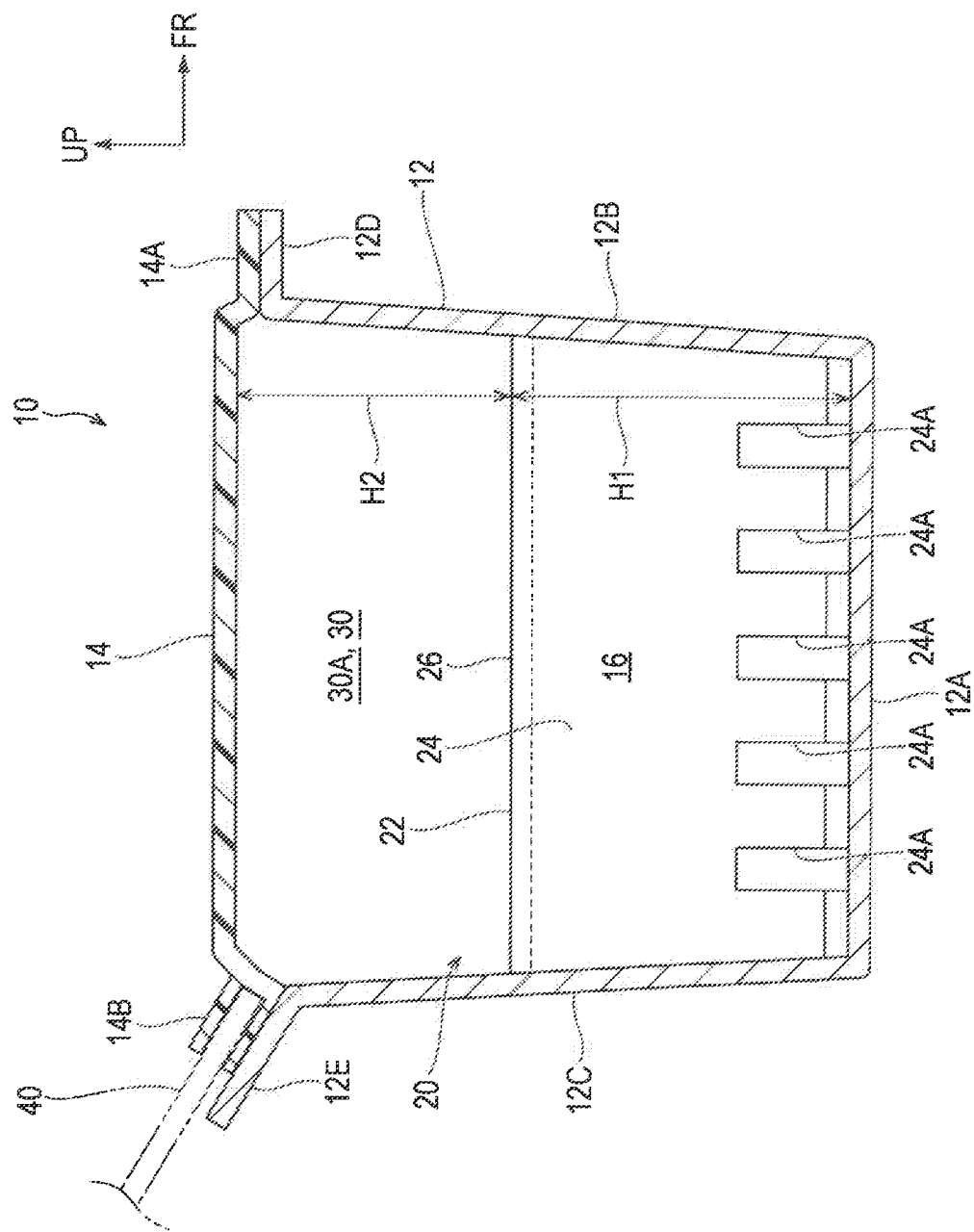
FIG. 3 is a schematic, right sectional view (enlarged sectional view taken along line 3-3 in FIG. 2) of an inside of the vehicle cowl structure illustrated in FIG. 2.
Figure 4:
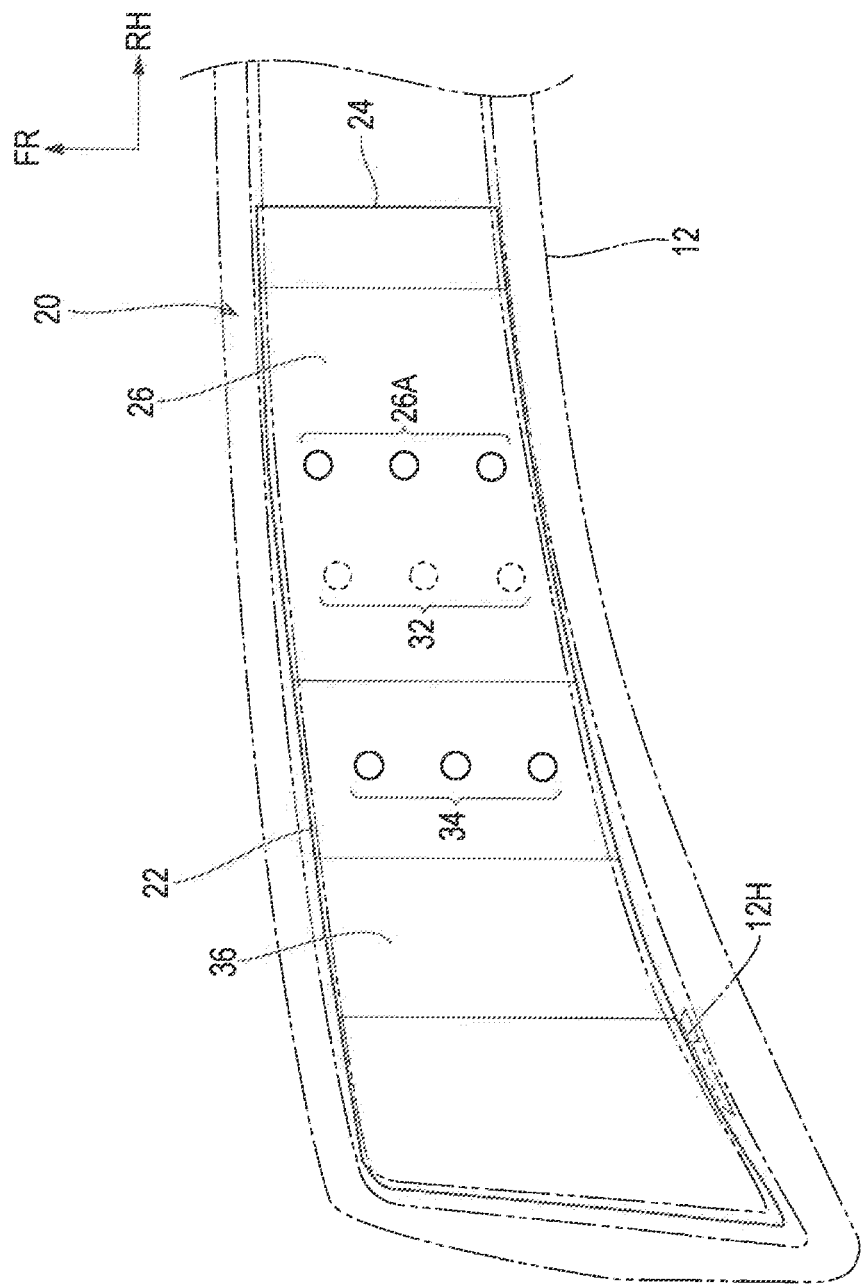
FIG. 4 is a top plan view of a chamber illustrated in FIG. 2.

As illustrated in FIGS. 2 to 4, the gas-liquid separation mechanism 20 is provided in the bottom part of the cowl duct part 16, and is disposed between the outside air inlets 14C and the air outlet 12H. In one example, the gas-liquid separation mechanism 20 is provided in the bottom part of the left part of the cowl body 12 and is disposed on the right side of the air outlet 12H. The gas-liquid separation mechanism 20 is configured to, when outside air (air) is introduced into the cowl duct part 16, allow air and liquid such as rainwater contained in the outside air to be separated from each other.

The gas-liquid separation mechanism 20 includes, as a main part, a chamber 22 having a hollow interior. The chamber 22 is provided on the bottom wall 12A of the cowl body 12 and is disposed on the right side of the air outlet 12H. The chamber 22 has a substantially hollow wedge shape protruding rightward and obliquely upward from the bottom wall 12A of the cowl body 12 when viewed from the front side. In one example, the chamber 22 includes a blocking wall 24 and a partition wall 26. The blocking wall 24 constitutes a right wall of the chamber 22. The partition wall 26 extends leftward from an upper end of the blocking wall 24. The blocking wall 24 and the partition wall 26 constitute an outer shell of the chamber 22.

The blocking wall 24 extends in the up-down direction and is inclined rightward (outside air inlet 14C side) toward an upper side when viewed from the front side. The lower end of the blocking wall 24 is bent rightward and joined to the bottom wall 12A of the cowl body 12. An upper end of the blocking wall 24 is disposed in an up-down intermediate part of the cowl duct part 16 and is disposed at a position spaced apart downward from the cowl top panel 14.

The partition wall 26 extends leftward from the upper end of the blocking wall 24. The partition wall 26 is smoothly inclined downward in a curved manner toward the left side when viewed from the front side. A left end (lower end) of the partition wall 26 is disposed to be in contact with the bottom wall 12A of the cowl body 12 and is joined to the bottom wall 12A. The chamber 22 is disposed adjacent to and between the front wall 12B and the rear wall 12C of the cowl body 12 (see FIG. 3). That is, the chamber 22 is provided over the entire length of the cowl duct part 16 in the front-rear direction. Consequently, the interior of the chamber 22 is defined by the blocking wall 24, the partition wall 26, and the bottom wall 12A, the front wall 12B, and the rear wall 12C of the cowl body 12. The defined interior space serves as a chamber interior 28.

Since the chamber 22 is disposed at the lower part (bottom part) of the cowl duct part 16, a space above the chamber 22 in the cowl duct part 16 is narrowed by the chamber 22. The space above the chamber 22 in the cowl duct part 16 serves as a duct throttle part 30. A cross-sectional area of the duct throttle part 30 is set to be smaller than a cross-sectional area of another part in the cowl duct part 16 and set to be larger toward the left side. Furthermore, an up-down dimension H1 of the blocking wall 24 is set to be larger than an up-down dimension H2 of an inlet 30A which is a right end of the duct throttle part 30 (see FIG. 3).

The blocking wall 24 has, at its lower end, multiple (in the present embodiment, five) water inlets 24A penetrating therethrough (see FIG. 3). The water inlets 24A each have a long hole shape whose longitudinal direction corresponds to the up-down direction, and are disposed side by side in the front-rear direction. This allows communication, through the water inlets 24A, between (the right space of) the cowl duct part 16 and the chamber interior 28, and the liquid flowing leftward in the cowl duct part 16 to be drawn into the chamber interior 28 through the water inlets 24A. The bottom wall 12A of the cowl body 12 constituting the chamber interior 28 has multiple (in the present embodiment, three) chamber-side drainage outlets 32 penetrating therethrough (see FIGS. 2 and 4). The chamber-side drainage outlets 32 are disposed side by side in the front-rear direction. Then, the liquid flowing into the chamber interior 28 is drained out of the cowl duct part 16 through the chamber-side drainage outlets 32. The partition wall 26 has multiple (in the present embodiment, three) communication ports 26A penetrating therethrough (see FIGS. 2 and 4). The communication ports 26A are disposed side by side in the front-rear direction. This allows communication, through the communication ports 26A, between the chamber interior 28 and the duct throttle part 30.

The bottom wall 12A of the cowl body 12 has, between the chamber 22 and the air outlet 12H, multiple (in the present embodiment, three) body-side drainage outlets 34 penetrating therethrough (see FIGS. 2 and 4). The body-side drainage outlets 34 are disposed side by side in the front-rear direction. The liquid having passed through the duct throttle part 30 is drained out of the cowl duct part 16 from the body-side drainage outlets 34.

Furthermore, the gas-liquid separation mechanism 20 has an inclined wall 36. The gas-liquid separation mechanism 20 is disposed on the left side of the chamber 22 and the body-side drainage outlets 34 and on the right side of the air outlet 12H, and is disposed above the bottom wall 12A of the cowl body 12. The inclined wall 36 is inclined upward toward the left side when viewed from the front side, and is disposed below the air outlet 12H. In the present embodiment, the inclined wall 36 and the chamber 22 are formed in one piece. The body-side drainage outlets 34 penetrate, in the up-down direction, a part coupling the front end of the inclined wall 36 to the rear end of the chamber 22.

Operation and Effects

Operation and effects of the present embodiment will now be described.

In the cowl structure 10 with the above structure, the outside air inlets 14C are formed at the right end of the cowl top panel 14, and the air outlet 12H is formed at the left end of the cowl body 12. When the air conditioner 46 of the vehicle V is turned on, the blower fan 46A of the air conditioner 46 is operated to allow the air in the cowl duct part 16 to be drawn in by suction from the air outlet 12H toward the air-conditioning duct 44. Consequently, the outside air (air) is introduced into the cowl duct part 16 through the outside air inlets 14C, and airflow directed from the outside air inlets 14C to the air outlet 12H is generated in the cowl duct part 16.

Here, water (liquid) such as rainwater may enter the cowl duct part 16 through the outside air inlets 14C together with air. At this time, airflow AR1 containing liquid water having relatively large particles flows leftward along the bottom wall 12A side of the cowl body 12 in the lower part of the cowl duct part 16. Consequently, as illustrated in FIG. 2, the airflow AR1 flowing along the bottom wall 12A side flows into the chamber interior 28 through the water inlets 24A of the blocking wall 24 of the chamber 22. Then, the water flowing into the chamber interior 28 is drained out of the cowl duct part 16 from the chamber-side drainage outlets 32 (see arrow B in FIG. 2), and the air flowing into the chamber interior 28 flows out from the communication ports 26A to the duct throttle part 30 side (see arrow A in FIG. 2). That is, the chamber 22 allows the air and the water having the relatively large particles contained in the airflow AR1 to be separated from each other, the separated water to be drained from the chamber-side drainage outlets 32, and the separated air to flow from the communication ports 26A toward the air outlet 12H. For example, when a large amount of water flows into the cowl duct part 16, the chamber 22 can achieve effective separation between water and air.

For example, when water droplets are scattered on the inside of the cowl duct part 16, airflow AR2 containing water droplets flows leftward on a substantially center side of the cowl duct part 16 and hits the blocking wall 24 of the chamber 22. This reduces the flow velocity of the airflow AR2 hitting the blocking wall 24. In addition, the blocking wall 24 is inclined rightward (upstream side of the airflow AR2) toward the upper side when viewed from the front side. In other words, the inclined wall 36 is inclined upward (downstream side of the airflow AR2) toward the left side when viewed from the front side. Thus, the airflow AR2 hitting the blocking wall 24 creates a vortex flow directed downward along the blocking wall 24 (see the airflow AR2 illustrated in FIG. 2). As a result, the vortex flow allows air and water contained in the airflow AR2 to be separated from each other.

For example, the airflow AR2 causes the separated water to flow downward along the blocking wall 24. Thus, in the same manner as described above, the water flows into the chamber interior 28 from the water inlets 24A of the blocking wall 24, and the water flowing into the chamber interior 28 is drained out of the cowl duct part 16 from the chamber-side drainage outlets 32.

Furthermore, for example, atomized water having relatively small particles contained in the separated water is drawn into the duct throttle part 30 by airflow AR3 (see FIG. 2) flowing leftward through the duct throttle part 30 of the cowl duct part 16. The atomized water drawn into the duct throttle part 30 flows together with the airflow AR3 flowing leftward along the bottom surface of the duct throttle part 30 (that is, the upper surface of the partition wall 26). Consequently, the water contained in the airflow AR3 adheres to the bottom surface of the duct throttle part 30 (that is, the upper surface of the partition wall 26) and flows to the bottom wall 12A side of the cowl body 12 along the partition wall 26. Then, the water flowing along the partition wall 26 is drained out of the cowl duct part 16 from the body-side drainage outlets 34 (see arrow C in FIG. 2).

As described above, when the airflow AR3 passes through the duct throttle part 30, the water separated by the blocking wall 24 and having the relatively small particles is guided to the body-side drainage outlets 34 by the partition wall 26 and is drained out of the cowl duct part 16. Thus, the dry air flows as the airflow AR3 from the air outlet 12H to the air-conditioning duct 44 and is supplied into the vehicle interior. When the water flowing along the partition wall 26 in the duct throttle part 30 is not drained from the body-side drainage outlets 34, and flows toward the air outlet 12H across the body-side drainage outlets 34, the flow of the water toward the air outlet 12H is hindered by the inclined wall 36. The water flows backward along the inclined wall 36 toward the body-side drainage outlets 34, and is drained out of the cowl duct part 16 from the body-side drainage outlets 34.

As described above, the gas-liquid separation mechanism 20 of the cowl structure 10 includes the chamber 22 having the interior serving as the chamber interior 28, and the chamber 22 is provided in the bottom part of the cowl body 12 and is disposed between the outside air inlets 14C and the air outlet 12H in the vehicle width direction. The chamber 22 includes the blocking wall 24 constituting a right wall of the chamber 22 and having, at its lower end, the water inlets 24A, the chamber-side drainage outlets 32, and the communication ports 26A that allows the chamber interior 28 to communicate with the inside of the cowl body 12 on the left side of the blocking wall 24. Consequently, as described above, the airflow AR1 containing the liquid water having the relatively large particles can be caused to flow into the chamber interior 28 from the water inlets 24A of the blocking wall 24, thus achieving separation between water and air. Then, the separated air can be returned from the chamber interior 28 to the cowl duct part 16 through the communication ports 26A and caused to flow toward the air outlet 12H, and the separated water can be drained out of the cowl duct part 16 from the chamber-side drainage outlets 32. Furthermore, the airflow AR2 containing the water scattered in droplets can be caused to hit the blocking wall 24 of the chamber 22, thus achieving separation between the air and the water contained in the airflow AR2. That is, in the cowl structure 10 of the present embodiment, the water and the air can be separated from each other in the inside of the chamber interior 28 for the airflow AR1 containing the liquid water having the relatively large particles, and the water and the air can be separated from each other by the blocking wall 24 for the airflow AR2 containing the water scattered in droplets. As described above, according to the cowl structure 10 of the present embodiment, it is possible to achieve satisfactory separation between the liquid and the air.

In addition, the blocking wall 24 is inclined rightward (outside air inlet 14C side) toward the upper side when viewed from the front side. Consequently, as described above, it is possible to create a vortex flow directed downward when the airflow AR2 hits the blocking wall 24. As a result, the vortex flow allows water droplets and air contained in the airflow AR2 to be effectively separated from each other.

In addition, the chamber 22 is disposed at a position spaced apart downward from the cowl top panel 14, and the partition wall 26 of the chamber 22 extends leftward from the upper end of the blocking wall 24. Furthermore, the partition wall 26 is inclined downward toward the left side when viewed from the front side, and the lower end of the partition wall 26 is coupled to the bottom wall 12A of the cowl body 12. Consequently, in the cowl duct part 16, the duct throttle part 30 can be located above the chamber 22. Thus, the atomized water separated by the blocking wall 24 and having small particles can be drawn into the duct throttle part 30 by the airflow AR3 flowing through the duct throttle part 30. Furthermore, the water drawn into the duct throttle part 30 can be guided to the bottom wall 12A of the cowl body 12 along the bottom surface of the duct throttle part 30 (the upper surface of the partition wall 26), and be drained from the body-side drainage outlets 34 of the cowl body 12.

In addition, the up-down dimension H1 of the blocking wall 24 of the chamber 22 is set to be larger than the up-down dimension H2 of the inlet 30A of the duct throttle part 30. That is, an area of the blocking wall 24 when viewed in the left-right direction is set to be larger than an area of the inlet 30A of the duct throttle part 30. This can increase the flow velocity of the airflow AR3 flowing through the inlet 30A of the duct throttle part 30. Consequently, the atomized water separated by the blocking wall 24 and having the small particles can be satisfactorily drawn into the duct throttle part 30 by the airflow AR3.

The inclined wall 36 is provided in the bottom part of the cowl body 12 between the body-side drainage outlets 34 and the air outlet 12H. The inclined wall 36 is inclined upward toward the air outlet 12H when viewed from the front side, and is disposed below the air outlet 12H. This allows the water contained in airflow AR3 that has passed through the duct throttle part 30 to be returned toward the body-side drainage outlets 34 by the inclined wall 36 and to be drained from the body-side drainage outlets 34 even if the water passes the body-side drainage outlets 34 to the left without being drained from the body-side drainage outlets 34.

In the present embodiment, although an inclination angle of the blocking wall 24 with respect to the bottom wall 12A of the cowl body 12 is not particularly defined, for example, the inclination angle of the blocking wall 24 can be appropriately changed according to an up-down dimension of the cowl structure 10.

In addition, from the viewpoint of satisfactorily creating a vortex flow after the airflow AR2 hits the blocking wall 24, thus achieving separation between the air and the liquid in the airflow AR2, the blocking wall 24 is desirably disposed to be inclined rightward toward the upper side, but the blocking wall 24 may be disposed along the up-down direction when viewed from the front side. Even in this case, the air and the liquid contained in the airflow AR2 can be separated from each other by causing the airflow AR2 to hit the blocking wall 24.

In the present embodiment, the bottom wall 12A of the cowl body 12 may be slightly inclined downward toward the left side when viewed from the front side. This can cause liquid water flowing along the bottom wall 12A to satisfactorily flow into the chamber interior 28 of the chamber 22.

Figure 5:
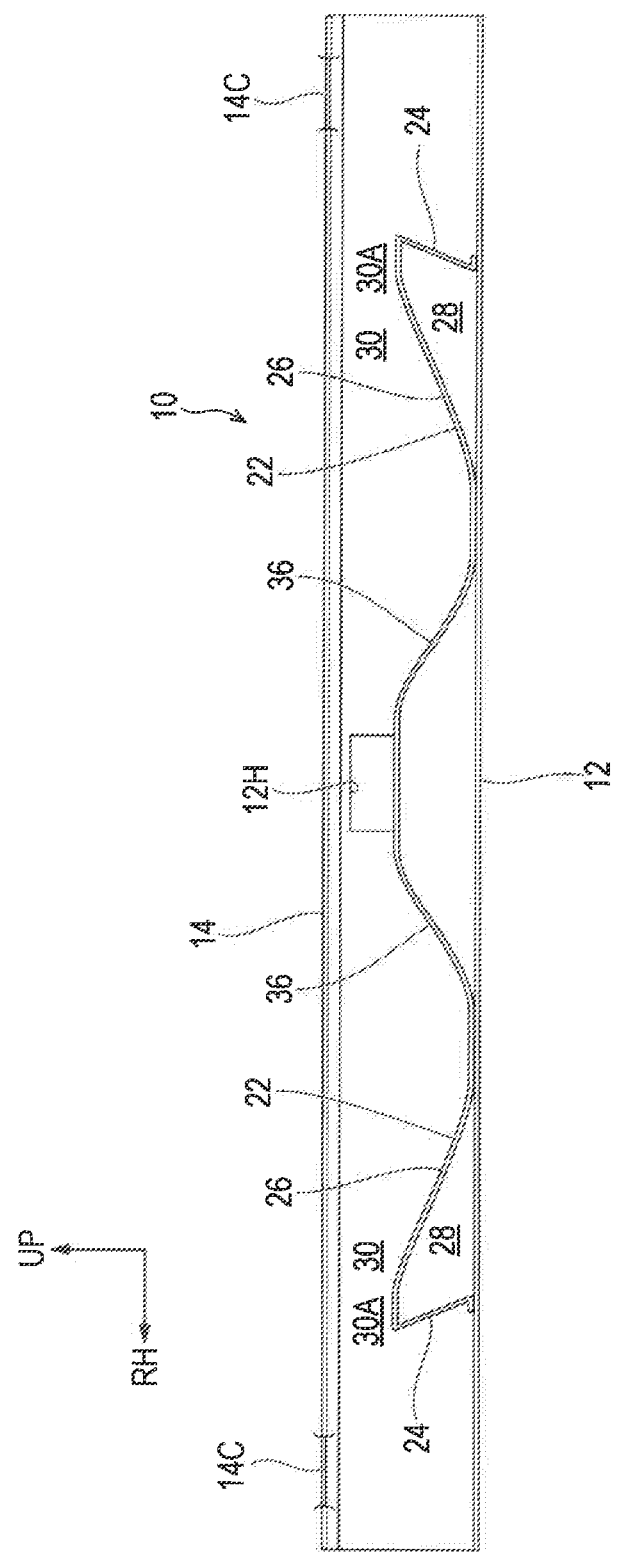
FIG. 5 is a schematic, front view illustrating a modification of the vehicle cowl structure according to the present embodiment.

Furthermore, in the present embodiment, one chamber 22 is applied in the cowl structure 10, but two chambers 22 may be applied corresponding to various vehicles. For example, as illustrated in FIG. 5, when the outside air inlets 14C are at respective vehicle-widthwise ends of the cowl top panel 14, and the air outlet 12H is at the vehicle-widthwise center part of the cowl body 12, each of the chambers 22 may be disposed between each outside air inlet 14C and the air outlet 12H. In this case, the chambers 22 are disposed symmetrically with respect to the vehicle-widthwise center part of the cowl structure 10.

Furthermore, in the present embodiment, the chamber 22 is disposed on the right part of the cowl body 12, but the chamber 22 can be set at any position. For example, the chamber 22 can be set at any position corresponding to a wiper unit or an airbag apparatus to be mounted in the cowl body 12.

In the present embodiment, although the chamber 22 and the inclined wall 36 are formed in one piece in the gas-liquid separation mechanism 20, the chamber 22 and the inclined wall 36 may be formed in separate pieces.

The invention claimed is:
1. A vehicle cowl structure for a vehicle comprising:
a cowl body extending in a vehicle width direction on a vehicle front side of a lower end of a windshield glass of the vehicle and having a recessed shape with an upper opening facing a vehicle upper side when viewed in a longitudinal direction of the cowl body;
a cowl panel extending in the vehicle width direction on the vehicle upper side of the cowl body, closing the upper opening of the cowl body, and having an outside air inlet configured to allow outside air to be introduced into the cowl body;

an air outlet disposed in the cowl body and configured to allow air inside the cowl body to be discharged toward a vehicle interior of the vehicle; and a chamber having a hollow interior serving as a chamber interior, provided in a bottom part of the cowl body, and disposed between the outside air inlet and the air outlet in the vehicle width direction, wherein the chamber comprises a blocking wall constituting a wall of the chamber on a side of the outside air inlet, extending upward from a bottom wall of the cowl body, and having, at a lower end of the blocking wall, a water inlet configured to allow liquid inside the cowl body to be drawn into the chamber interior, a chamber-side drainage outlet configured to allow the liquid drawn into the chamber interior to be drained out, and a communication port disposed on a side of the air outlet with respect to the blocking wall and configured to allow the chamber interior to communicate with an inside of the cowl body.

2. The vehicle cowl structure according to claim 1, wherein the blocking wall is inclined toward the outside air inlet in a direction toward the vehicle upper side when viewed from the vehicle front side.

3. The vehicle cowl structure according to claim 2, wherein the chamber comprises a partition wall disposed at a position spaced apart from a vehicle lower side of the cowl panel and extending from an upper end of the blocking wall toward the air outlet, and the partition wall is inclined toward the vehicle lower side in a direction toward the air outlet when viewed from the vehicle front side, and has a lower end coupled to the bottom wall of the cowl body.

4. The vehicle cowl structure according to claim 2, wherein the cowl body has, in the bottom wall of the cowl body, a body-side drainage outlet between the chamber and the air outlet, the body-side drainage outlet being configured to allow the liquid inside the cowl body to be drained out.

5. The vehicle cowl structure according to claim 3, wherein the cowl body has, in the bottom wall of the cowl body, a body-side drainage outlet between the chamber and the air outlet, the body-side drainage outlet being configured to allow the liquid inside the cowl body to be drained out.

6. The vehicle cowl structure according to claim 4, wherein the cowl body comprises, in the bottom part of the cowl body, an inclined wall between the body-side drainage outlet and the air outlet, and when viewed from the vehicle front side, the inclined wall is inclined toward the vehicle upper side in a direction toward the air outlet, and is disposed on a vehicle lower side relative to the air outlet.

7. The vehicle cowl structure according to claim 5, wherein the cowl body comprises, in the bottom part of the cowl body, an inclined wall between the body-side drainage outlet and the air outlet, and when viewed from the vehicle front side, the inclined wall is inclined toward the vehicle upper side in a direction toward the air outlet, and is disposed on the vehicle lower side relative to the air outlet.

* * * * *